United States Patent Office.

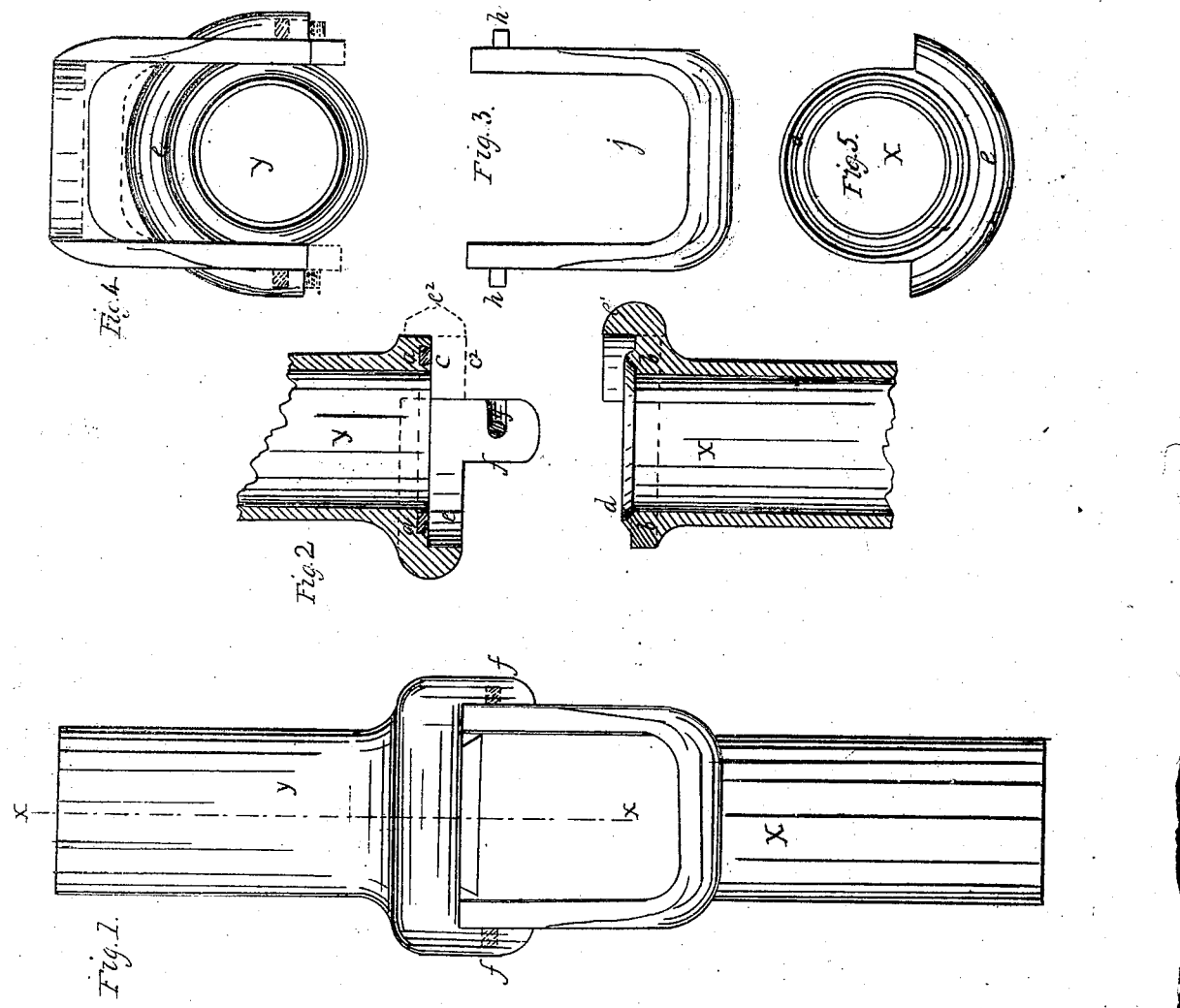

NATHAN THOMPSON, OF BROOKLYN, NEW YORK.

Letters Patent No. 72,566, dated December 24, 1867.

---

IMPROVED PIPE-COUPLING.

---

The Schedule referred to in these Letters Patent and making part of the same.

---

TO ALL WHOM IT MAY CONCERN:

Be it known that I, NATHAN THOMPSON, a citizen of the United States, at present domiciled in the city of Brooklyn, in the State of New York, have invented a new and useful Improvement in Couplings, and that the following, taken in connection with the drawings, is a full, clear, and exact description thereof. In the drawings—

Figure 1 is an elevation of both members of the coupling secured together.

Figure 2 is a longitudinal section through both parts thereof, with the locking-piece detached.

Figure 3 is a plan of the locking-piece.

Figure 4, an end view of that part of the coupling which carries the locking-piece, with the locking-piece in place.

Figure 5 is an end view of the other part or member of the coupling.

My present invention is based upon that for which Letters Patent of the United States were granted to me upon the 24th day of September, 1867, and is particularly designed for the coupling together of lengths of inflexible pipes, and more especially when such pipes are used in confined localities, where the coupled lengths cannot well be moved sidewise.

In the drawings, the flanges, sockets, and ears or lugs, are shown as making part of the pipe, but they may be brazed thereon, or secured thereto in any suitable manner.

In the drawings, the flanges are shown at $a$ $b$, the one grooved, and containing a washer, $c$, the other furnished with a projecting compressing-ring, $d$. Each flange is, moreover, provided with a socket, $e$ $e^1$, semi-cylindrical or nearly so; but I intend sometimes to dispense with the sockets, and at others to form the whole socket upon either one or the other of the flanges, (see dotted lines in fig. 2, at $e^2$,) and at others to use washers, lying upon the surface of the flanges, either with or without a compressing-ring.

In consequence of the locking-piece being removable and readjustable at pleasure, as hereafter described, the two lengths of pipe and parts of coupling can be brought together in lines substantially identical with the axes of the pipes, and thus permit the socket to be made wholly upon one part of the coupling; and when so made, it performs an important function, as it is a perfect security against any uncoupling by lateral displacement of the parts, either intentional or accidental.

Ears or lugs $f f$ make part of or are secured to one member of the coupling, and in these ears are formed slots $g$ $g$. The locking-piece $j$ is composed of two cams, two levers, and a connecting-piece, the whole formed, by preference, of one piece of metal; but there may be several distinct locking-pieces or locking-cams, as described in my patent before referred to, and these locking-cams should be constructed as therein described. To the locking-piece are attached pivots $h$ $h$, of suitable size to enter the slots $g$ $g$.

In using this coupling, one part thereof is approached to and brought in contact with the other, the line of approach being that of the axis of both parts of the coupling, or substantially so. The locking-piece is then slipped on, so as to embrace the part $x$, to which the lugs are not attached, occupying, with relation to the other part, $y$, the position shown in red lines, fig. 4. The locking-piece is then shoved toward the flanges until the pivots are opposite the slots, and is then pulled, so as to carry the pivots into the slots, (see fig. 4.) The levers are then turned, the cams pressing upon the flange attached to $x$, until the locking-piece assumes the position shown in fig. 1. The cams then bear forcibly upon that surface of the flange of $x$ which is farthest from the washer, and the two parts of the coupling are locked together.

This construction of my coupling, so as to permit the coupling together of lengths of pipe without any lateral motion of either, will be especially useful in connecting together lengths of pipe, such as suction and discharge-pipes of pumps on shipboard, and also in performing the same office to lengths enclosed in boxes, or passing through floors or partitions in dwelling-houses or other buildings.

I claim, in combination with two flanges, making part of a coupling, ears, and a locking-piece, which can be disconnected from and connected to the said lugs or ears, the construction of the parts being substantially such as specified.

I also claim, in combination with two flanges making part of a coupling, and a locking-piece, capable of removal and replacement, a socket, attached to one of the flanges, and substantially surrounding the other, as described, the combination being substantially such as hereinbefore set forth.

NATHAN THOMPSON.

Witnesses:
D. C. GRAHAM,
IRA A. GERMAIN.